(12) United States Patent
Tse et al.

(10) Patent No.: US 6,895,471 B1
(45) Date of Patent: May 17, 2005

(54) METHOD AND APPARATUS FOR SYNCHRONIZING CACHE WITH TARGET TABLES IN A DATA WAREHOUSING SYSTEM

(75) Inventors: Eva Man-Yan Tse, Sunnyvale, CA (US); Pinaki Mukhopadhyay, Cupertino, CA (US); Sumitro Samaddar, Cupertino, CA (US)

(73) Assignee: Informatica Corporation, Redwood City, CA (US)

( * ) Notice: Subject to any disclaimer, the term of this patent is extended or adjusted under 35 U.S.C. 154(b) by 777 days.

(21) Appl. No.: 09/644,280

(22) Filed: Aug. 22, 2000

(51) Int. Cl.$^7$ .......................... G06F 12/08; G06F 17/30
(52) U.S. Cl. .......................... 711/118; 711/141; 707/8; 707/201
(58) Field of Search .................... 711/118, 141, 711/164, 202, 221; 707/8, 10, 201, 3, 101

(56) References Cited

U.S. PATENT DOCUMENTS

| | | | | |
|---|---|---|---|---|
| 5,832,496 A | * | 11/1998 | Anand et al. | 707/102 |
| 5,987,454 A | * | 11/1999 | Hobbs | 707/4 |
| 5,991,742 A | * | 11/1999 | Tran | 705/32 |
| 6,032,158 A | | 2/2000 | Mukhopadhyay et al. | 707/201 |
| 6,272,598 B1 | * | 8/2001 | Arlitt et al. | 711/133 |
| 6,339,775 B1 | * | 1/2002 | Zamanian et al. | 707/101 |
| 6,446,062 B1 | * | 9/2002 | Levine et al. | 707/3 |
| 6,493,800 B1 | * | 12/2002 | Blumrich | 711/129 |
| 6,601,062 B1 | * | 7/2003 | Deshpande et al. | 707/3 |
| 6,629,102 B1 | * | 9/2003 | Malloy et al. | 707/102 |
| 6,636,870 B2 | * | 10/2003 | Roccaforte | 707/101 |
| 2002/0099691 A1 | * | 7/2002 | Lore et al. | 707/2 |

OTHER PUBLICATIONS

Prasan, Seshadri, Shenoy, Sudarshan; "Don't Trash your Intermediate Results, Cache'em" Technical Report, Online, Mar. 2, 2000, pp. 1–22, XP002260088 IIT Bonbay, the whole document.

Chaudhuri, s. et al: An Overview of dta Warehousing and OLAP Technology SIGMOD Record, Sigmod, New York, No. US vol. 26, No. 1, Mar. 1997, pp. 65–74, XP002193792 ISSN: 0163–5808 the whole document.

Mohnia M. et al.: "Advances and Research directions in Data Warehousing Technology" Avis. Australian Journal of Information Systems, Wollongong, Au. vol. 7, No. 1, Sep. 1999, pp. 41–59, XP000978044 ISSN: 1039–7841 the whole document.

Makpangou et al.: Replicated Directory Service for Weakly Consistent Distributed Caches, INRIA SOR group–78143 Le Chesnay Cedex, France, pp. 1–9.

Rousskov, "Cache Digests" Computer Networks and ISDN System 30 (1998) 2155–2168.

* cited by examiner

*Primary Examiner*—Denise Tran

(57) ABSTRACT

A method and apparatus for processing (transporting) data, such as in a data warehouse system. In one embodiment, the data are received from a source and compared to data in a lookup cache comprising a subset of data from a first data set (e.g., a dimension table). Instances of the data not present in a lookup cache (that is, new data) are identified. Information corresponding to these instances are generated (e.g., a unique identifier is associated with each of these instances), and the first data set is updated accordingly. The lookup cache is then updated with the new data and the unique identifiers. Accordingly, the information (data) in the lookup cache and in the first data set are in synchronization. The lookup cache does not need to be rebuilt (e.g., to update a second data set such as a fact table).

25 Claims, 6 Drawing Sheets

METHOD AND APPARATUS FOR SYNCHRONIZING CACHE WITH TARGET TABLES IN A DATA WAREHOUSING SYSTEM

TECHNICAL FIELD

The present invention relates to data management systems. More particularly, the present invention pertains to an apparatus and method for synchronizing data in a data warehousing application.

BACKGROUND ART

Due to the increased amounts of data being stored and processed today, operational databases are constructed, categorized, and formatted for operational efficiency (e.g., throughput, processing speed, and storage capacity). Unfortunately, the raw data found in these operational databases often exist as rows and columns of numbers and code which appear bewildering and incomprehensible to business analysts and decision makers. Furthermore, the scope and vastness of the raw data stored in modern databases render it harder to analyze. Hence, applications were developed in an effort to help interpret, analyze, and compile the data so that a business analyst may readily understand it. This is accomplished by mapping, sorting, and summarizing the raw data before it is presented for display. Thereby, individuals can now interpret the data and make key decisions based thereon.

Extracting raw data from one or more operational databases and transforming it into useful information is the function of data "warehouses" and data "marts." In data warehouses and data marts, the data are structured to satisfy decision support roles. Before the data are loaded into the target data warehouse or data mart, the corresponding source data from an operational database are filtered to remove extraneous and erroneous records; cryptic and conflicting codes are resolved; raw data are translated into something more meaningful; and summary data that are useful for decision support, trend analysis or other end-user needs are pre-calculated.

The data warehouse is comprised of an analytical database containing data useful for decision support. The warehouse contains data from multiple sources and formats. Data are extracted from the sources, transformed as needed, and mapped into the warehouse. A data mart is similar to a data warehouse, except that it contains a subset of corporate data for a single aspect of business, such as finance, sales, inventory, or human resources. With data warehouses and data marts, useful information is retained at the disposal of the decision-makers.

One major difficulty associated with implementing data warehouses and data marts relates to that of transporting data, non-invasively and in a timely manner, from the operational databases to the data warehouses and/or data marts. As new transactions occur, vast amounts of new data are generated and added to the operational databases. If the new data are not transported to the data warehouse/mart databases by the time of analysis, these databases are out of sync with the operational databases. Consequently, the data within the data warehouses/marts lose their relevance for the analyses used in support of the decision-makers.

To maintain the relevance of the decision-making analyses, and to quickly capture the rich data patterns and information contained in the operational databases, frequent refreshes of the data warehouses/marts are preferred. However, operational databases are very large to begin with, and they can rapidly grow larger as new data are accumulated. As a result, data transport processes (data extraction, transformation, and loading) can consume a significant amount of system resources and take a long time to complete. Thus, it is desirable to find approaches for non-invasive data transport that can increase the throughput and speed of the data transporting process.

Prior Art FIG. 1 is a block diagram depicting the flow of data in accordance with a prior art data warehousing application. The model used to create a data mart capable of handling complex decision support queries is known as multi-dimensional modeling; one type of multi-dimensional model is called the "star schema." A star schema is characterized by two types of tables: fact tables, and dimension tables. In a data warehousing application, a fact table is where numerical measurements of a business are stored, taken at the intersection of the dimensions from one or more dimension tables. For example, a fact table may include sales in dollars, number of units sold, total price, and the like. Dimension tables store the descriptions or characteristics of the business; dimension tables contain the descriptors of the facts. For example, product, customer, region, or time could be used as dimensions. A dimension table usually contains a primary key, and a fact table contains the foreign key.

With reference still to FIG. 1, for many applications, in particular electronic business ("e-business") applications, a slowly changing dimension table (first target database 18) and an aggregate fact table (second target database 28) are both populated with information from a same source (operational database 10). Currently, this is accomplished by first populating dimension table 18 with one target load order group (TLOG) (e.g., pipeline 1) and then populating fact table 28 with another TLOG (e.g., pipeline 2).

In pipeline 1, operational data are read from operational database 10, and the data are passed through aggregator 12, lookup 14 and filter 16 to identify and filter out duplicates of previously read data already stored in dimension table 18. Instances of data that are not duplicates are then added to dimension table 18. In pipeline 2, operational data are read from operational database 10, the operational data are passed through lookup 24 and aggregator 26 to transform the data into a format useful for decision support.

An example will be used to provide a further description of pipelines 1 and 2. From a previous execution of a pipeline, dimension table 18 will contain customer names and a unique identifier (a "customer ID") associated with each name. Lookup cache 15a is built based on the information in dimension table 18 before execution of pipeline 1; specifically, lookup cache 15a is built from a persisted cache file from dimension table 18. Thus, lookup cache 15a will contain those customer names and/or the customer IDs already in dimension table 18 from the previous execution of the pipeline, before execution of pipeline 1.

When new transactions (e.g., customer purchases) occur, new data will be added to operational database 10. In fact, a customer may make several purchases, and so the customer's name may appear several times in operational database 10. Pipelines 1 and 2 therefore need to be executed in order to update dimension table 18 and fact table 28, respectively, with the new data in operational database 10.

If the customer's name and associated customer ID are not already in dimension table 18, then it is necessary to assign a customer ID and add the name and the ID to dimension table 18. However, if the customer's name and ID are already in dimension table 18, then this is not necessary. In addition, it is not necessary or desirable to assign a customer ID to each of the multiple instances in which the customer's name appears in operational database 10.

Before updating dimension table 18, aggregator 12 functions to identify and combine duplicate instances of customer names in operational database 10. Lookup 14 compares the output from aggregator 12 against lookup cache 15a to identify new customer names. If the customer name appears in lookup cache 15a, then it is not a new name; in this case, filter 16 filters out the name so that it is not added to dimension table 18 (i.e., filter 16 filters out the rows in which the lookup value was found). If the name does not appear in lookup cache 15a, then it is a new name; in this case, the name is forwarded to dimension table 18. Sequence generator 17 then functions to automatically generate a customer ID (e.g., a primary key) for each new customer name.

To populate fact table 28 in pipeline 2, operational database 10 is read again. To get the customer IDs needed for fact table 28, a new lookup cache 15b is built by reading from dimension table 18 before pipeline 2 executes. Lookup cache 15a cannot be reused because, after it was built, dimension table 18 was updated with new customer names and IDs. Thus, dimension table 18 contains more recent information that is not contained in lookup cache 15a. Lookup cache 15b is built after execution of pipeline 1 but before the execution of pipeline 2, and thus will contain the information added to dimension table 18 in pipeline 1.

Lookup 24 reads the customer IDs from lookup cache 15b, and aggregator 26 calculates the data for fact table 28. For example, aggregator 26 may calculate the total sales per customer. In this case, fact table 28 would contain the customer IDs and the total sales associated with each customer ID.

The prior art is problematic because, as described above, after the execution of pipeline 1 the dimension table 18 will contain more recent information (e.g., new customer name and customer IDs) than that contained in lookup cache 15a. As a result, it is necessary to re-initialize lookup cache 15a (that is, build lookup cache 15b) before populating fact table 28 (before executing pipeline 2). That is, any updates to the dimension table require that the lookup cache be rebuilt. Caches 15a and 15b can be very large (often on the order of two gigabytes each), and so rebuilding the lookup cache can consume valuable processing resources (e.g., computer resources such as processor cycles and memory), and can also decrease the speed at which data are transported and processed, thereby decreasing data throughput.

Another problem with the prior art is that operational database 10 is read twice, first to populate dimension table 18 in pipeline 1, and then to populate fact table 28 in pipeline 2. As described above, operational database 10 is very large (often on the order of 25 gigabytes), and so it can take several hours to read. Reading operational database 10 more than once also consumes valuable processing resources and decreases the speed at which data are transported and processed, decreasing data throughput. Additionally, it can impact negatively on the throughput of the transaction operating against the operational database.

Potential solutions for addressing these problems are complicated by the use of different processes in different portions of the pipeline. For example, in the PowerMart Suite by Informatica of Palo Alto, Calif., a Data Transformation Manager (DTM) manages one portion of pipeline 1, and a Writer process is launched for another portion of pipeline 1, as illustrated in FIG. 1.

Accordingly, what is needed is a method and/or apparatus that can increase the speed at which data are transported and processed, and reduce the load on processing resources. What is also needed is a method and/or apparatus that can satisfy the above needs and that can be adapted for use in a data warehouse system. The present invention provides a method and

SUMMARY OF THE INVENTION

The present invention provides a method and apparatus that can increase data throughput, thereby increasing the speed at which data are transported and processed. The present invention also provides a method and apparatus that can reduce the load on processing resources. Furthermore, the present invention provides a method and apparatus that can be used in a data warehouse system.

A method and apparatus for processing (transporting) data are disclosed. In one embodiment, the data are received from a source and compared to data in a lookup cache comprising data from a first data set. Instances of the data not present in a lookup cache (that is, new data) are identified. Information corresponding to these instances are generated (e.g., a unique identifier is associated with each of these instances), and the first data set is updated accordingly. The lookup cache is also updated with the new data and the unique identifiers. Accordingly, the information (data) in the lookup cache and in the first data set are in synchronization. The lookup cache does not need to be rebuilt (e.g., to update a second data set), and therefore data processing can be more quickly completed using less computational resources.

In a preferred embodiment, the method and apparatus of the present invention are utilized in a data warehousing application. In one such embodiment, operational data are received from a source table and compared to data in a lookup cache comprising data from a target table (e.g., a dimension table). Instances of the operational data not present in the lookup cache are identified. The lookup cache is updated to include these instances. The dimension table is also updated to include these instances. Thus, the data in the lookup table and the data in the dimension table are synchronous. Because the lookup cache does not need to be rebuilt (e.g., to update a second target table such as a fact table), the efficiency and throughput of the data warehousing application is increased, and the application can be more quickly executed using less computational resources.

In another data warehousing embodiment, the operational data are read from the source only once in order to update the dimension table and a second target table (e.g., a fact table). As above, the dynamic lookup cache remains synchronized with the dimension table and thus does not need to be rebuilt. In this embodiment, the dimension table and the fact table are both updated in a single pass through a data transport pipeline, further increasing the efficiency and throughput of the data warehousing application.

BRIEF DESCRIPTION OF THE DRAWINGS

The accompanying drawings, which are incorporated in and form a part of this specification, illustrate embodiments of the present invention and, together with the description, serve to explain the principles of the invention.

Prior Art

DETAILED DESCRIPTION OF THE INVENTION

Figure 1:
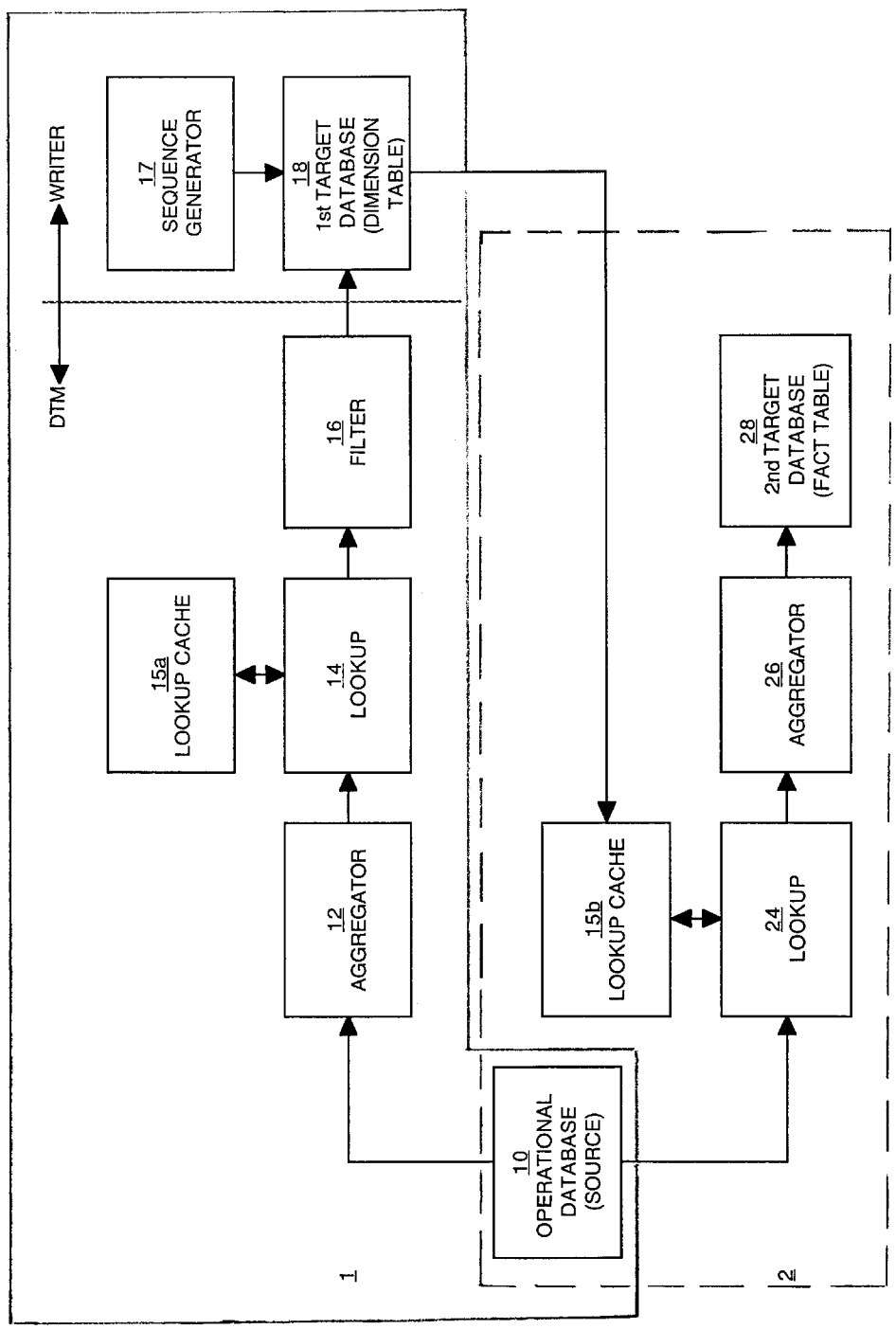
FIG. 1 is a block diagram depicting the flow of data in data processing pipelines used in one embodiment of a prior art data warehousing application.

An apparatus and method for synchronizing data in a data management system are described. In particular, an apparatus and method for synchronizing data in a cache with data in a target table in a data warehousing system are described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

Notation and Nomenclature

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "identifying," "updating," "associating," "storing," "receiving," "generating," "performing" or the like, can refer to the actions and processes (e.g., process 600 of FIG. 6) of a computer system or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices.

Data transport operations extract data from the source database, transform the data, and load the transformed data into a target database. The terms "data transport" and "data transportation" as used herein include data extraction, transformation (processing), and loading.

"Target databases" (or "target tables") are data warehouses and/or data marts into which transformed data are loaded. In the present embodiment, one or more target databases are specified for storing the data generated by data transport "pipelines."

The term "pipeline" as used herein refers to an architecture for data transport (e.g., data extraction, transformation, and storage). A "target load group order" (TLOG) refers to the set of target databases which are populated with transformed data from the same set of source databases; this term also can refer to the act of executing a pipeline. Accordingly, the execution of a pipeline or TLOG can load transformed data into one or more target databases. A "session" or "mapping" can include one or more pipelines or TLOGs. Multiple sessions can occur in parallel (e.g., multiple users executing pipelines in parallel) or in series.

A pipeline structure is formed using a distributed architecture that packages source code such that the responsibility is distributed to smaller units (e.g., components) of source code. Each one of these software components is responsible for one specific type of transformation. Transformation components can be provided by the developer (e.g., from a monolithic transformation application) or can be user-developed. These transformation components form a base of ready-made elements that are combined to build functionally more sophisticated transformations in the data transportation process.

The transformation components are then coupled together to form the pipeline structure. Further information regarding the use of coupled transformation components to form pipelines is described in the U.S. Patent Application entitled "Method and Architecture for Automated Optimization of ETL Throughput in Data Warehousing Applications," with Ser. No. 09/116,426 and filing date Jul. 15, 1998, now U.S. Pat. No. 6,208,990, assigned to the assignee of the present invention and hereby incorporated by reference.

In one embodiment, there are thirteen different transformation components: source, target, expression, aggregation, filter, rank, update strategy, sequence, joiner, lookup, stored procedure, external procedure, and normalizer. The source transformation contains tables, views, synonyms, or flat files that provide data for the data mart/data warehouse. The target transformation maintains database objects or files that receive data from other transformations. These targets then make the data available to data mart users for decision support. Expression transformations calculate a single result, using values from one or more ports. The aggregation transformation calculates an aggregate value, such as a sum or average, using the entire range of data within a port or within a particular group. Filter transformations filter (selects) records based on a condition the user has set in the expression. The rank transformation filters the top or bottom range of records, based on a condition set by the user. The update strategy transformation assigns a numeric code to each record indicating whether the server should use the information in the record to insert, delete, or update the target. The sequence generator transformation generates unique ID numbers. The joiner transformation joins records from different databases or file systems. The lookup transformation looks up values. The stored procedure transformation calls a stored procedure. The external procedure transformation calls a procedure in a shared library or in the Component Object Model (COM) layer of Windows NT.

The normalizer transformation normalizes records, including those read from virtual storage access method (VSAM) sources.

In the present embodiment, the source, target, aggregation, rank, and joiner transformations are all staged transformations. The lookup transformation also becomes a staged transformation when caching is turned on. The data generated by these transformations are automatically staged by the software, without human intervention. The expression, filter, update strategy, sequence, stored procedure, external procedure, and normalizer transformations are all streamed transformations. Other new types of transformations can also be added to this list.

Exemplary Computer System Platform

Figure 2:
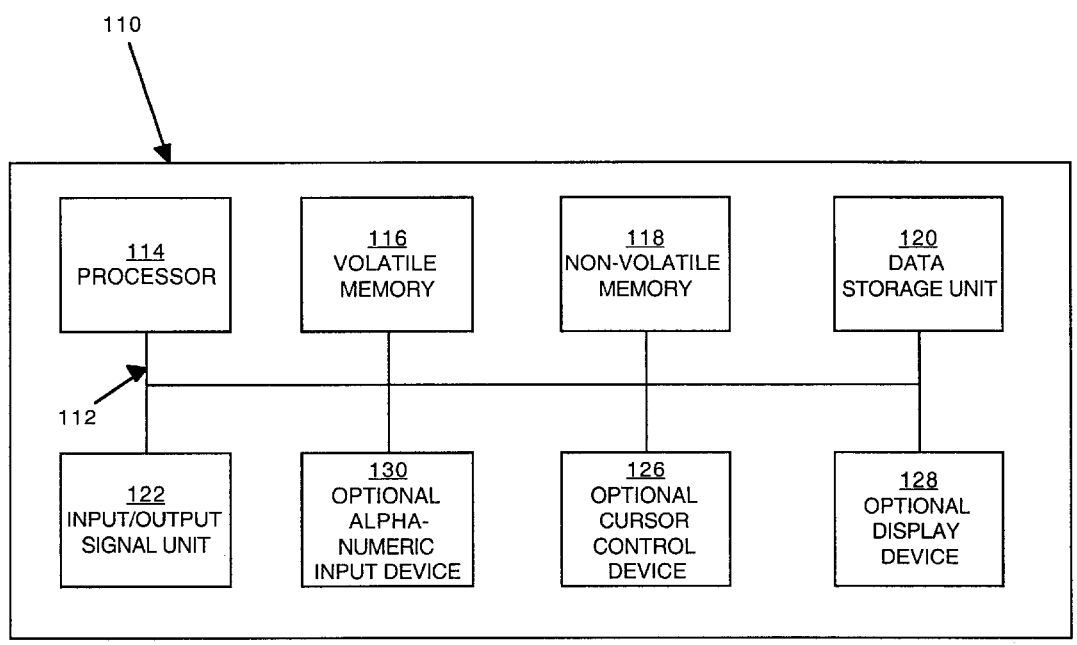
FIG. 2 is a block diagram of an exemplary computer system used as part of a data warehousing system in accordance with one embodiment of the present invention.

With reference to FIG. 2, portions of the present invention are comprised of the computer-readable and computer-executable instructions which reside, for example, in computer system 110 used as a part of a data warehousing system in accordance with one embodiment of the present invention. It is appreciated that computer system 110 of FIG. 2 is exemplary only and that the present invention can operate within a number of different computer systems including general-purpose computer systems, embedded computer systems, and stand-alone computer systems specially adapted for data warehousing applications.

In the present embodiment, computer system 110 includes an address/data bus 112 for conveying digital information between the various components, a central processor unit (CPU) 114 for processing the digital information and instructions, a volatile main memory 116 comprised of volatile random access memory (RAM) for storing the digital information and instructions, and a non-volatile read only memory (ROM) 118 for storing information and instructions of a more permanent nature. In addition, computer system 110 may also include a data storage unit 120 (e.g., a magnetic, optical, floppy, or tape drive or the like) for storing vast amounts of data, and an input output (I/O) signal unit (e.g., interface) 122 for interfacing with peripheral devices (e.g., a computer network, modem, mass storage devices, etc.). It should be noted that the software program for performing the transport process of the present invention can be stored either in volatile memory 116, data storage unit 120, or in an external storage device (not shown).

Devices which are optionally coupled to computer system 110 include a display device 128 for displaying information to a computer user, an alphanumeric input device 130 (e.g., a keyboard), and a cursor control device 126 (e.g., mouse, trackball, light pen, etc.) for inputting data, selections, updates, etc.

Furthermore, computer system 110 may be coupled in a network, such as in a client/server environment, whereby a number of clients (e.g., personal computers, workstations, portable computers, minicomputers, terminals, etc.) are used to run processes for performing desired tasks (e.g., inventory control, payroll, billing, etc.).

Method and System for Synchronizing Cache

Figure 3:
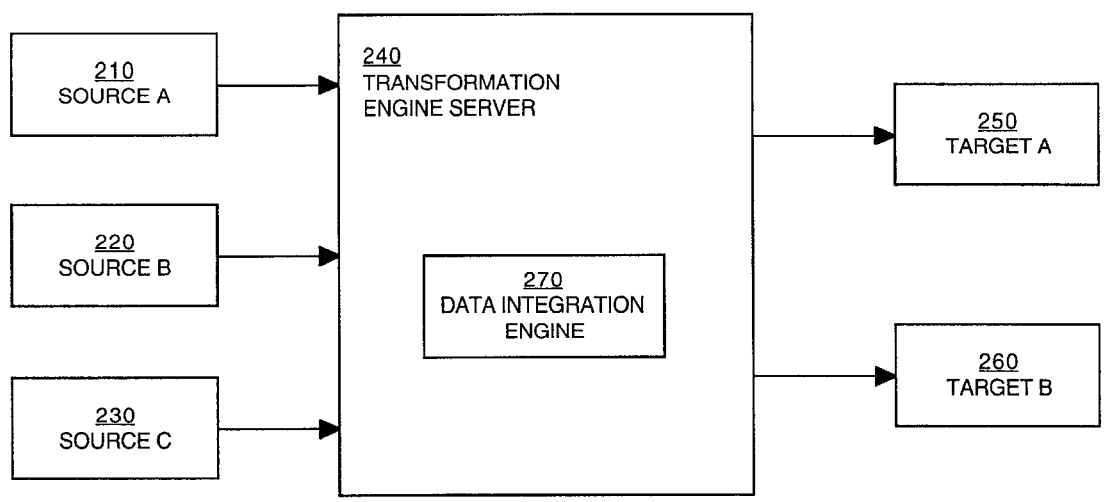
FIG. 3 illustrates an exemplary data warehouse architecture that includes a transformation engine server in accordance with one embodiment of the present invention.

FIG. 3 illustrates an exemplary data warehouse architecture 200 upon which an embodiment of the present invention may be practiced. Operational databases 210, 220, and 230 (sources A, B and C, respectively) store data resulting from business and financial transactions, and/or from equipment performance logs. These databases can be any of the conventional Relational Database Management Systems (RDBMS) (such as from Oracle, Informix, Sybase, Microsoft, etc.) that reside within a high capacity mass storage device (such as hard disk drives, optical drives, tape drives, etc.). Databases 250 and 260 (targets A and B, respectively) are the data warehouses or data marts that are the targets of the data transportation process.

Data integration engine 270 is a functional element that can be implemented in software and/or hardware for performing data transport operations. In the present embodiment, data integration engine 270 is a software program, operable on transformation engine server 240, that performs data transport operations. That is, in the present embodiment, data from databases 210, 220, and 230 are extracted, transformed, and loaded by transformation engine server 240 into databases 250 and 260. In one embodiment, transformation engine server 240 can include multiple microprocessors which run an operating program (such as Windows NT, UNIX, or the like). Data integration engine 270 can extract data from source databases 210, 220, and 230 and store the extracted source data, when storage is required, in the memory storage of transformation engine server 240.

Figure 4:
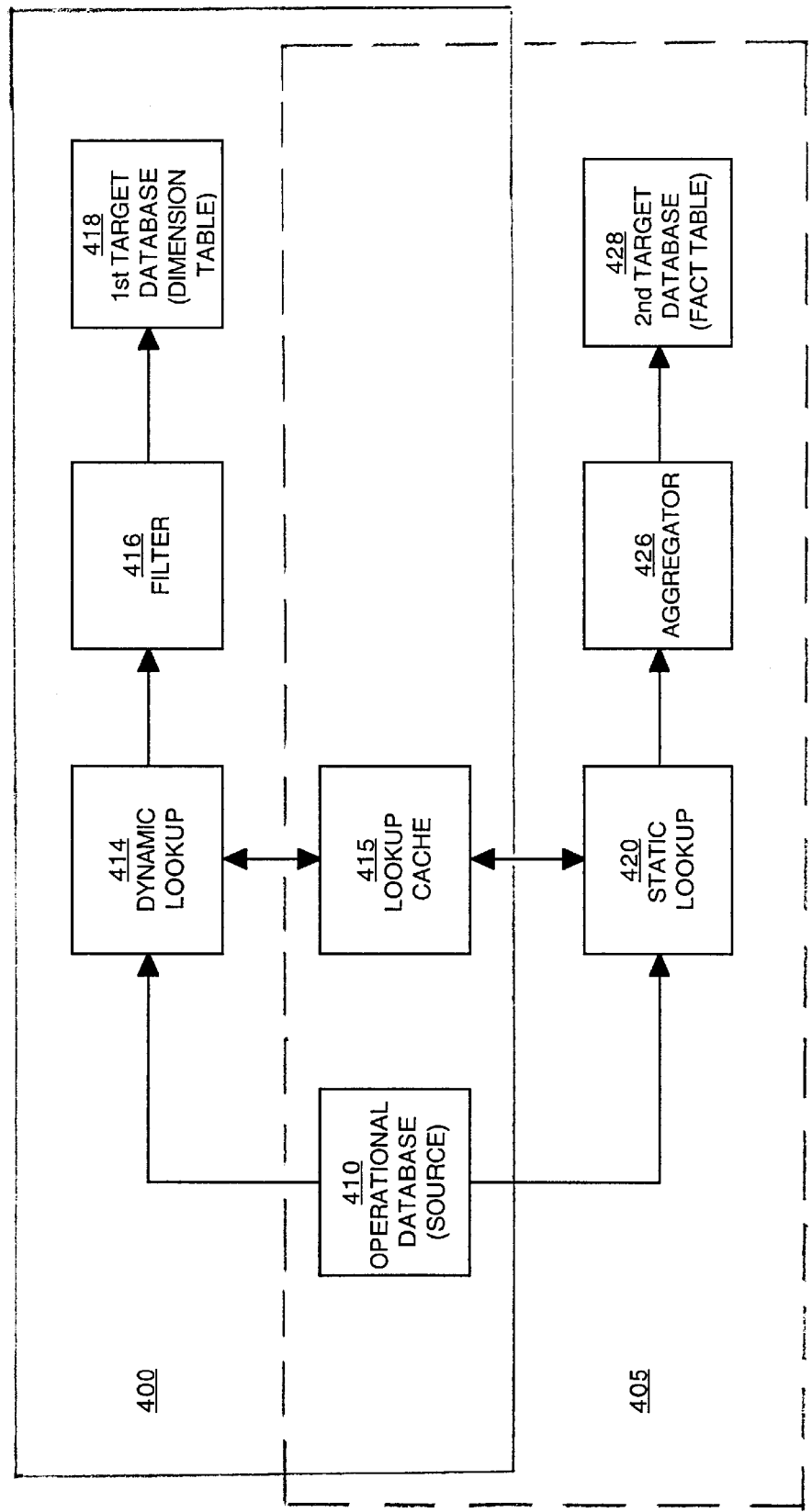
FIG. 4 is a block diagram depicting the flow of data in a data transport pipeline for a data warehouse application in accordance with one embodiment of the present invention.

FIG. 4 is a block diagram depicting the flow of data in data transport pipelines 400 and 405 in accordance with one embodiment of the present invention. In the preferred embodiment, pipelines 400 and 405 are used in a data warehousing application. Pipelines 400 and 405 are exemplary; additional databases and transformations may be included in accordance with the present invention.

In the present embodiment, pipeline 400 (e.g., a first TLOG) is used to populate a first target database (e.g., dimension table 418), and pipeline 405 (e.g., a second TLOG) is used to populate a second target database (e.g., fact table 428). Pipelines 400 and 405 can both be executed in a single session or mapping. Dimension table 418 and fact table 428 can also reside in a same target database (that is, the first and second target databases could be the same database, but different physical tables).

In pipeline 400, operational data are read from operational database 410. Dynamic lookup 414 is performed using lookup cache 415, and filter 416 identifies and filters out duplicates of previously read data already stored in dimension table 418. Instances of data that are not duplicates are then added to dimension table 418 and also to lookup cache 415.

In pipeline 405, operational data are read from operational database 410, and static lookup 420 is performed using lookup cache 415. The data are passed through aggregator 426 to transform the data into a format useful for decision support, trend analysis, and the like, and then added to fact table 428.

In the present embodiment, operational database 410 is read from twice. However, in accordance with the present invention, the same lookup cache 415 is used in both pipeline 400 and in pipeline 405. As will be seen, the lookup cache used in pipeline 400 does not need to be rebuilt for pipeline 405, and therefore data processing can be more quickly completed using less computational resources.

In accordance with the present embodiment of the present invention, the data in lookup cache 415 are synchronized with the data in dimension table 418, so that lookup cache 415 includes information added to dimension table 418. That is, in accordance with the present invention, when dimension table 418 is updated, lookup cache 415 is also updated. Lookup cache 415 can then be used to populate fact table 428. In accordance with the present embodiment of the present invention, it is not necessary to re-initialize lookup cache 415 before executing pipeline 405.

Because, in practice, multiple dimension tables can describe one fact table, or the same dimension table can be used to describe multiple fact tables, additional pipelines with dimension tables, lookup caches and fact tables (not shown) can be appended to pipelines 400 and 405 in accordance with the present invention, depending on the particular data characteristics and descriptors that are to be used and the type of information desired for the data warehouse/mart. In addition, this would allow population of a star schema multi-dimensional model.

With reference still to FIG. 4, an example application is used to provide a further description of the features of the present embodiment of the present invention. In this example, the descriptor (dimension) of interest is the customer name and the fact of interest is the sales per customer.

From a previous execution of pipeline 400, dimension table 418 will contain customer names and a unique identifier (a "primary key" such as a "customer ID") associated with each name. Subsequently, new transactions (e.g., customer purchases) occur and so new data are added to operational database 410. In fact, a customer may make several purchases, and so the customer's name may appear several times in operational database 410.

If the customer's name and associated customer ID are not already in dimension table 418, then it is necessary to assign a customer ID and add the name and the ID to dimension table 418. However, if the customer's name and ID are already in dimension table 418, then this is not necessary. In addition, it is not necessary or desirable to assign a customer ID to each of the multiple instances in which the customer's name appears in operational database 410.

A lookup 414 is performed to compare the output from source 410 to lookup cache 415 to identify new customer names. In one embodiment, the user specifies whether the lookup 414 is dynamic or not. For a dynamic lookup, in accordance with the present invention, lookup cache 415 is synchronized with dimension table 418, and therefore lookup cache 415 contains the same customer names as dimension table 418.

In one embodiment, if lookup 414 is dynamic, there is an additional output port (O), and each lookup port (L) will either be associated with an input port (I) or specified as the sequence ID port. Table 1 below provides an exemplary port specification in accordance with one embodiment of the present invention. In this embodiment, for dynamic lookups, the column entitled "Associated Port for Lookup Updates" is enabled and the default output column "NewLookupRow" is used.

TABLE 1

Exemplary Port Specification for Dynamic Lookups

| Port Name | Data Type | Associated Port for Lookup Updates | I | O | L |
|---|---|---|---|---|---|
| NewLookupRow | integer | n/a | | x | |
| InCustName | string | n/a | x | | |
| InCustAddress | string | n/a | x | | |
| LkupCustName | string | InCustName | | x | x |
| LkupCustAddress | string | InCustAddress | | x | x |
| LkupCustId | integer | sequenceID | | x | x |

In the embodiment of Table 1, NewLookupRow will output an integer value of 1 (one) if the current input row is not found in lookup cache 415 and is to be inserted into lookup cache 415. NewLookupRow will output an integer value of 0 (zero) if the current input row is found in lookup cache 415. If a new lookup row is added to lookup cache 415, any subsequent references to that lookup row are considered to be found. Hence, the NewLookupRow port will return 0 (zero) for subsequent rows with the same lookup key.

In the present embodiment, for each lookup port, an associated input port or the sequenceID indicator is specified and inserted into lookup cache 415 when a row cannot be found. For a lookup port marked as an output port, the output value will be exactly what is being inserted into lookup cache 415.

In accordance with the present embodiment of the present invention, when a new row is inserted into dimension table 418, a new primary key is generated using an internal sequence generator (not shown), and the new row and key are inserted in lookup cache 415. Thus, in accordance with the present invention, dimension table 418 and lookup cache 415 are synchronized and comprise the same information.

If the customer's name appears in lookup cache 415, then it is not a new name; in this case, filter 416 filters out the name so that it is not added to dimension table 418. If the name does not appear in lookup cache 415, then it is a new name; in this case, lookup cache 415 is updated and the name is added to dimension table 418. A customer ID (e.g., a primary key) is associated with each customer name in lookup cache 415 and dimension table 418.

After pipeline 400 is executed, lookup cache 415 is persisted (saved) so that it can be used in pipeline 405. In pipeline 405, operational database 410 is read again. Customer IDs needed for fact table 428 are read from lookup cache 415 in static lookup 420. Static lookup 420 uses the persisted lookup cache 415 from pipeline 400. In accordance with the present invention, lookup cache 415 can be used in pipeline 405 because it has been updated with new customer names and IDs. Aggregator 426 calculates the data for fact table 428; for example, aggregator 426 may calculate the total sales per customer. In this case, fact table 428 would contain the customer names, customer IDs and the total sales associated with each customer ID.

In accordance with the present invention, lookup cache 415 can be shared across different sessions (e.g., mappings) and different pipelines (e.g., different TLOGs). In one embodiment, the persisted lookup cache 415 (e.g., from pipeline 400) is assigned an identifying attribute such as a file name. When performing a different session or mapping, a user can specify the attribute in order to use the same lookup cache in multiple sessions or mappings. If no file name is specified, or if the cache cannot be found, a new lookup cache will be created.

Figure 5:
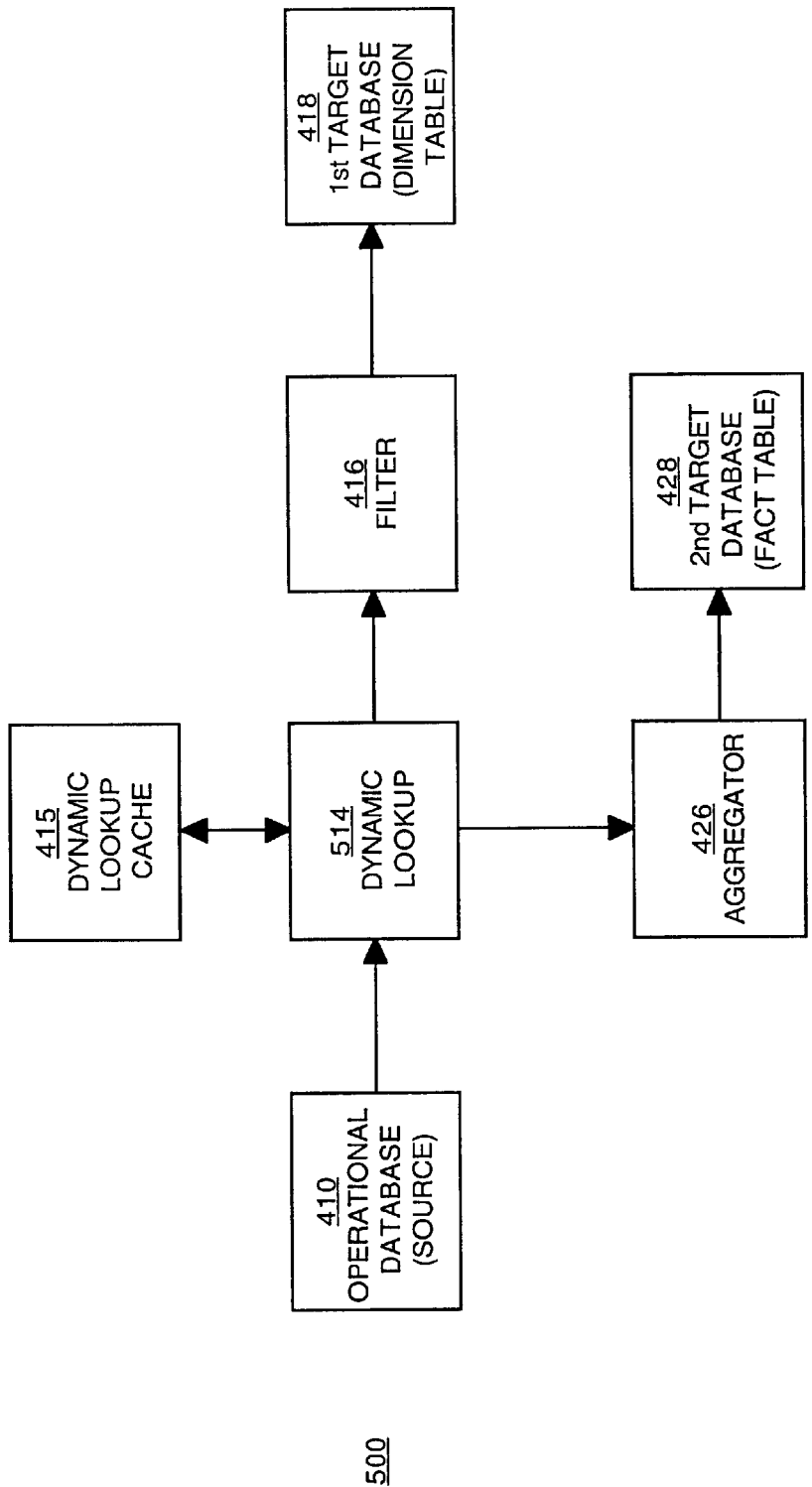
FIG. 5 is a block diagram depicting the flow of data in a data transport pipeline for a data warehouse application in accordance with another embodiment of the present invention.

FIG. 5 is a block diagram depicting the flow of data in a data transport pipeline 500 in accordance with one embodiment of the present invention. In the preferred embodiment, pipeline 500 is used in a data warehousing application.

In the present embodiment, a single data transport pipeline 500 is used to populate a dimension table (first target database 418) and a fact table (second target database 428) with information from a source (operational database 410). Dynamic lookup 514 can be used with filter 416 to filter out duplicates of previously read data already stored in dimension table 418, and dynamic lookup 514 can also be used to find, for example, customer IDs needed for fact table 428. Thus, relative to FIG. 4, dynamic lookup 514 is performed instead of dynamic lookup 414 and static lookup 420.

Thus, in accordance with the present embodiment of the present invention, it is only necessary to access and read operational database 410 one time. In addition, it is only necessary to maintain a single lookup cache 415 and to read the lookup cache one time (e.g., dynamic lookup 514). Consequently, data throughput is increased, thereby increasing the speed at which data are transported and processed. In addition, the load on processing resources is reduced (e.g., computer resources such as processor cycles and memory).

Figure 6:
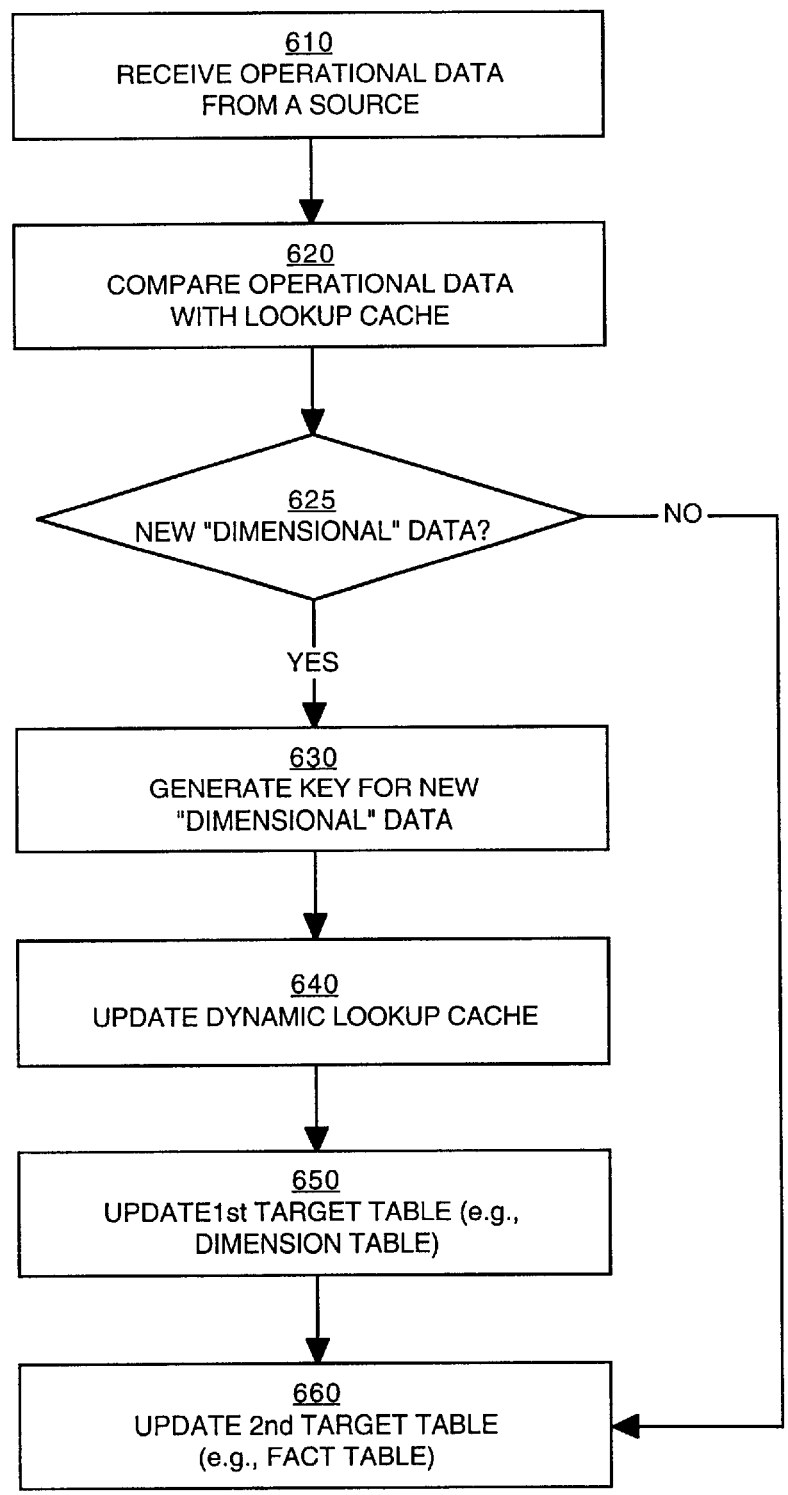
FIG. 6 is a flowchart of the steps in a process for synchronizing databases used in a data transport pipeline in accordance with one embodiment of the present invention.

FIG. 6 is a flowchart of the steps in a process 600 for synchronizing databases used in a data transport pipeline (e.g., pipelines 400 and 405 of FIG. 4, or pipeline 500 of FIG. 5) in accordance with one embodiment of the present invention. Process 600 can be implemented via computer-readable program instructions stored in a memory unit (e.g., volatile memory 116, non-volatile memory 118, and/or data storage unit 120) and executed by processor 114 of computer system 110 (FIG. 2). However, it is appreciated that portions of pipelines 400, 405 and 500 can reside on different computer systems that are communicatively linked. That is, for example, with reference again to FIGS. 4 and 5, operational database 410 can reside on one computer system, dimension table 418 on the same computer system or a different one, and fact table 428 on one of these computer systems or still another one. Also, as explained above, it is appreciated that lookup cache 415 can be shared across multiple sessions.

In step 610 of FIG. 6, operational data are received from a source (e.g., operational database 410). In the present embodiment, data are read row-by-row and processed through the data transport pipeline.

In step 620, the operational data are compared against a lookup cache (e.g., lookup cache 415 of FIGS. 4 and 5) to identify any instances in which an entry in the operational data is already present in a first target database (e.g., dimension table 418 of FIGS. 4 and 5). In accordance with the present invention, the data in the lookup cache and the data in the first target data base are synchronized. For example, the lookup cache can contain those customer names already in the first target database. Thus, when the operational data are compared to the lookup cache, any instances of "dimensional" data (e.g., a customer name) not in the lookup cache must be new.

In step 625 of FIG. 6, if there are no new instances of operational data, then process 600 proceeds to step 660. Otherwise, process 600 proceeds to step 630.

In step 630, a unique identifier (e.g., a primary key) is generated for and associated with each instance of new dimensional data using, for example, a sequence generator. It is appreciated that other information may be generated for and associated with each new instance of dimensional data.

In steps 640 and 650 of FIG. 6, respectively, the lookup cache (e.g., lookup cache 415 of FIG. 4) and the first target database (e.g., dimension table 418 of FIG. 4) are each updated. In accordance with the present invention, the lookup cache is dynamic and in synchronization with the first target database.

In step 660, a second target database (e.g., fact table 428 of FIG. 4) can be generated or updated (depending on whether it was previously initialized in a prior execution of the data transport pipeline) using the operational database information and the information from the first target database. In one embodiment, the second target database is updated in a single session comprising two pipelines (two TLOGS), as shown by FIG. 4. In another embodiment, the second target database is updated in a single session comprising a single pipeline (one TLOG), as shown by FIG. 5.

In summary, in accordance with the present invention, the dimension table and the lookup cache are synchronized so that the lookup cache can be updated during a session run. Thus, it is only necessary to build the lookup cache one time in order to populate a dimension table and a fact table during a session.

In addition, in accordance with the present invention, operational data do not need to be aggregated to combine duplicate data before doing the lookup (e.g., an aggregation step before dynamic lookup 414 and 514 of FIGS. 4 and 5, respectively, is not needed). Instead, this aggregation is performed automatically because, once an entry is inserted into dynamic cache, it is considered to be found, and subsequent rows of data will have the NewLookupRow set to zero (see discussion pertaining to Table 1, above). Accordingly, one stage in the data transport pipeline (and the associated memory and processing) can be eliminated in accordance with the present invention.

In one embodiment, a single data transport pipeline can be used to populate both the dimension table and a fact table during a session run. Accordingly, in this embodiment, it is only necessary to access and read an operational database one time during a session, which can reduce the processing time by up to one-half.

As a result of each of these improvements, data throughput is increased, thereby increasing the speed at which data are transported and processed. The present invention therefore provides a method and apparatus that can increase data throughput, thereby increasing the speed at which data are transported and processed. The present invention also provides a method and apparatus that can reduce the load on processing resources. Furthermore, the present invention provides a method and apparatus that can be used in a data warehouse system.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modification as are suited to the particular use contemplated. It is intended that the scope of the invention be defined by the claims appended hereto and their equivalents.

What is claimed is:

1. A method for processing data in a data warehousing application, said method comprising:

a) receiving operational data from a source table of said data warehousing application;

b) identifying an instance of said operational data not present in a lookup cache;

c) updating said lookup cache to include said instance so that said lookup cache includes updated data;

d) updating a first target table of said data warehousing application to include said instance so that data in said lookup cache and data in said first target table are synchronous; and e) generating information for a second target table of said data warehousing application using said updated data from said lookup cache;

wherein said steps a)–e) are performed in a first data processing session.

2. The method for processing data in a data warehousing application as recited in claim 1 wherein said operational data comprise a customer identifier.

3. The method for processing data in a data warehousing application as recited in claim 1 wherein said step c) comprises:

associating a primary key with said instance; and storing said primary key in said lookup cache.

4. The method for processing data in a data warehousing application as recited in claim 1 wherein said steps a)–e) are performed using a single data processing pipeline.

5. The method for processing data in a data warehousing application as recited in claim 1 wherein said first target table is a dimension table and said second target table is a fact table.

6. The method for processing data in a data warehousing application as recited in claim 1 wherein said step e) comprises:

performing an aggregation calculation to generate information for said second target table.

7. The method for processing data in a data warehousing application as recited in claim 1 wherein said lookup cache is assigned an identifying attribute, wherein said lookup cache can be selected for a second data processing session using said identifying attribute.

8. A method for processing data, said method comprising:

a) receiving data from a source;

b) identifying an instance of said data not present in a lookup cache;

c) updating a first data set to include said instance;

d) synchronizing data in said lookup cache with said first data set so that said data in said lookup cache is updated to include said instance; and e) generating information for a second data set using said data including said instance from said lookup cache;

wherein said steps a)–e) are performed in a first data processing session.

9. The method for processing data as recited in claim 8 wherein said source comprises operational data for a data warehousing application.

10. The method for processing data as recited in claim 9 wherein said operational data comprise a customer identifier.

11. The method for processing data as recited in claim 8 wherein said first data set is a dimension table for a data warehousing application and said second data set is a fact table for a data warehousing application.

12. The method for processing data as recited in claim 8 wherein said step d) comprises:

associating a unique key with said instance; and storing said unique key in said lookup cache.

13. The method for processing data as recited in claim 8 wherein said step e) comprises:

performing an aggregation calculation in a data warehousing application to generate information for said second data set.

14. The method for processing data as recited in claim 8 wherein said steps a)–e) are performed using a single data processing pipeline.

15. The method for processing data as recited in claim 8 wherein said lookup cache is assigned an identifying attribute, wherein said lookup cache can be selected for a second data processing session using said identifying attribute.

16. A computer-usable medium having computer-readable program code embodied therein for causing a computer system to perform a method comprising:

a) receiving operational data from a source table of a data warehousing application;

b) identifying an instance of said operational data not present in a lookup cache;

c) updating said lookup cache to include said instance so that said lookup cache includes updated data;

d) updating a first target table of said data warehousing application to include said instance so that data in said lookup cache and data in said first target table are synchronous; and e) generating information for a second target table of said data warehousing application using said updated data from said lookup cache;

wherein said steps a)–e) are performed in a first data processing session.

17. The computer-usable medium of claim 16 wherein said operational data comprise a customer identifier.

18. The computer-usable medium of claim 16 wherein said computer-readable program code embodied therein causes a computer system to perform said method comprising:

associating a primary key with said instance; and storing said primary key in said lookup cache.

19. The computer-usable medium of claim 16 wherein said steps a)–e) are performed using a single data processing pipeline.

20. The computer-usable medium of claim 16 wherein said first target table is a dimension table and said second target table is a fact table.

21. The computer-usable medium of claim 16 wherein said computer-readable program code embodied therein causes a computer system to perform said method comprising:

performing an aggregation calculation to generate information for said second target table.

22. The computer-usable medium of claim 16 wherein said lookup cache is assigned an identifying attribute, wherein said lookup cache can be selected for a second data processing session using said identifying attribute.

23. A computer-usable medium having computer-readable program code embodied therein for causing a computer system to perform a method comprising:

a) receiving data from a source;

b) identifying an instance of said data not present in a lookup cache;

c) updating a first data set to include said instance;

d) synchronizing data in said lookup cache with said first data set so that said data in said lookup cache is updated to include said instance; and e) generating information for a second data set using said data including said instance from said lookup cache;

wherein said steps a)–e) are performed in a first data processing session.

24. The computer-usable medium of claim 23 wherein said steps a)–e) are performed using a single data processing pipeline.

25. The computer-usable medium of claim 23 wherein said lookup cache is assigned an identifying attribute, wherein said lookup cache can be selected for a second data processing session using said identifying attribute.

* * * * *